Oct. 7, 1952 — J. E. BEVINS — 2,612,753
CONSTANT SPEED PUMP AND MOTOR HYDRAULIC TRANSMISSION
Filed Nov. 7, 1947 — 5 Sheets-Sheet 3

INVENTOR
JAMES E. BEVINS
BY
Frederic H. Miller
ATTORNEY

Oct. 7, 1952     J. E. BEVINS     2,612,753
CONSTANT SPEED PUMP AND MOTOR HYDRAULIC TRANSMISSION
Filed Nov. 7, 1947     5 Sheets-Sheet 4
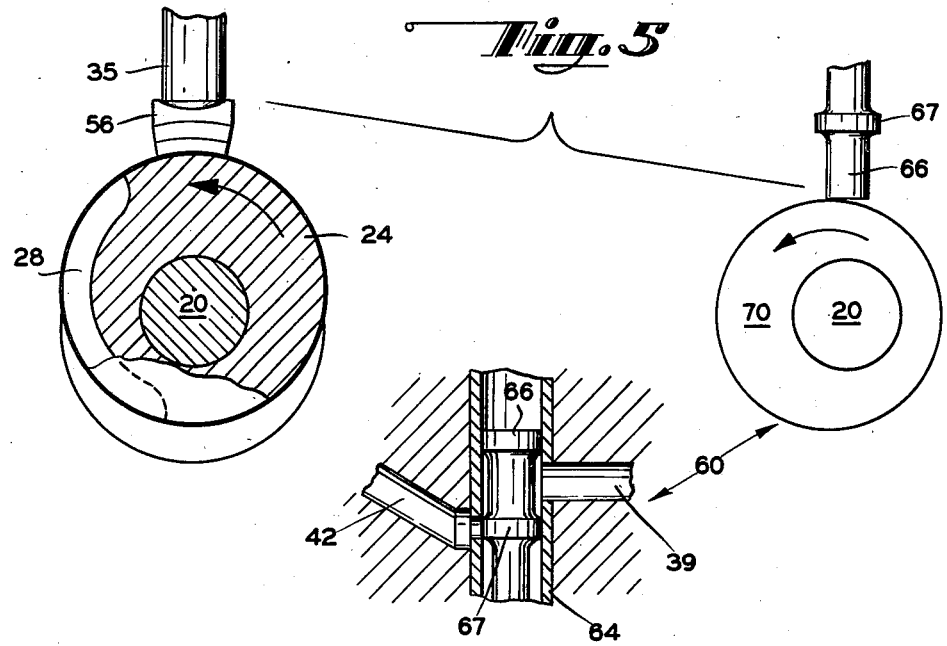
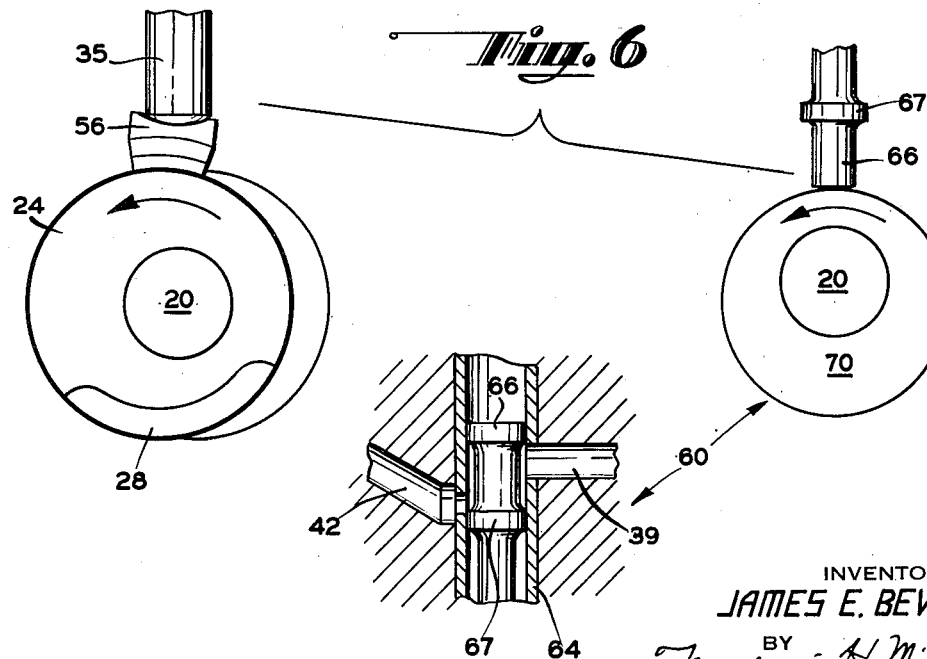
INVENTOR
JAMES E. BEVINS
BY
Frederic H. Miller
ATTORNEY

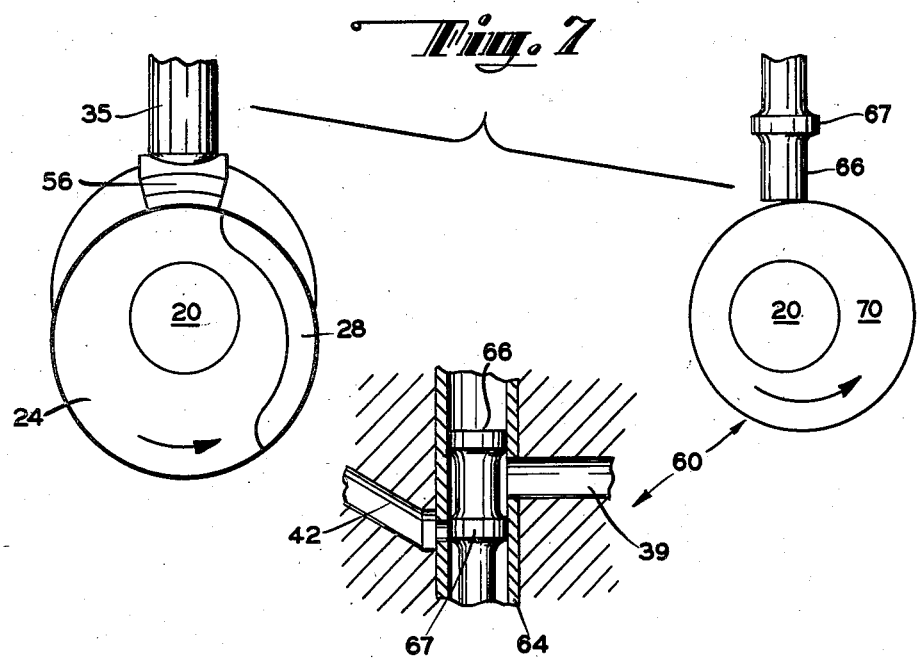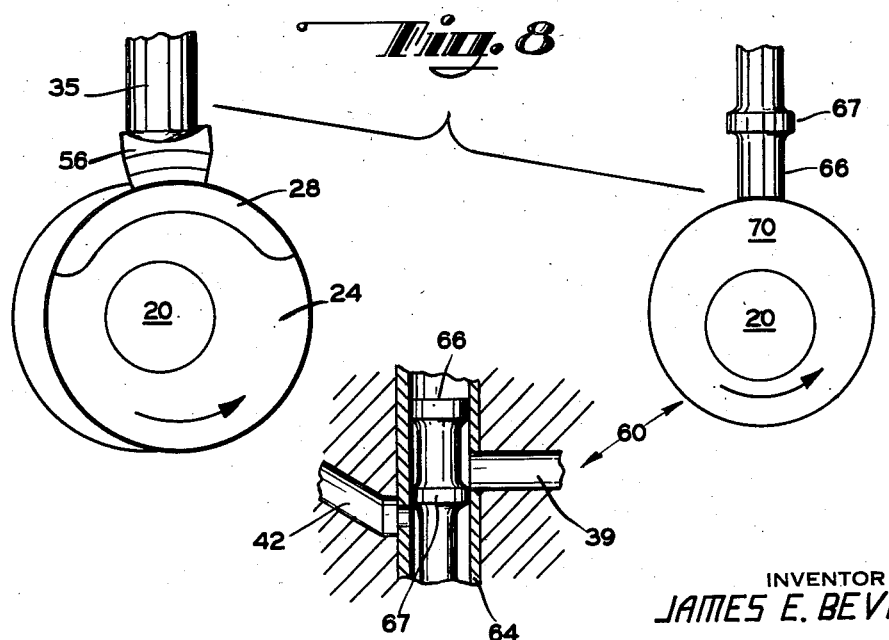

Patented Oct. 7, 1952

2,612,753

UNITED STATES PATENT OFFICE 2,612,753

CONSTANT SPEED PUMP AND MOTOR HYDRAULIC TRANSMISSION

James Emil Bevins, Ramsey, N. J., assignor to Bendix Aviation Corporation, Teterboro, N. J., a corporation of Delaware Application November 7, 1947, Serial No. 784,708

6 Claims. (Cl. 60—53)

This invention relates to constant speed transmissions, and particularly to a transmission of the hydraulic pump and motor type driven at variable speed, as by an aircraft engine.

Former devices of such character have been unduly heavy, have not held up in operation, are subject to excessive wear and have other disadvantages not adapting them particularly well to aircraft service.

An object of the present invention is to provide a device of the above-indicated character which is lighter in weight, holds up in operation over longer periods of time, is subject to less wear and has other advantages over prior devices for comparable duty, rendering it an effective aircraft accessory.

Another object is to provide a constant speed drive, comprising hydraulic motor, pump and control units, which will hold a substantially constant output motor speed of a predetermined number of revolutions per minute, such as 6000±300 R. P. M., over a given range of pump input speeds, such as 2100 to 9000 R. P. M., at a continuous horsepower rating, such as fifty, at input speeds over a given range, as between 3600 and 9000 R. P. M.

Another object is to provide a drive as aforesaid having a speed characteristic such that two or more thereof are adapted for parallel operation to drive alternators, and to have the power divided within reasonable limits by a built-in linear droop mechanism providing a speed regulation within definite percentage limits, such as eight per cent droop from no load to one hundred and fifty per cent load in the alternator.

Another object is to provide a transmission of the above-indicated character which is simple and durable in construction, economical to manufacture, and effective in its operation.

The above and other objects and features of the invention will appear more fully hereinafter from a consideration of the following description taken in connection with the accompanying drawings wherein one embodiment of the invention is illustrated by way of example.

In the drawings:

Figure 5 is a diagram showing, at the left, a fragment of a motor piston and cam; at the center, a portion of the timing valve assembly of Figure 3, and, at the right, a valve cam and another portion of the timing valve of Figure 3, all as positioned in relation to each other at a certain phase or step of the motor operation, when fluid flow to or from the motor piston is completely shut off;

Figure 6 shows the parts of Figure 5 as related at a next subsequent step of operation, when the motor piston is fully subjected to the pressure fluid;

Figure 7 shows the parts of Figure 5 as related at a third successive step of operation, in which the pressure and exhaust fluids are again completely shut off from the motor piston; and Figure 8 shows the parts of Figure 5 as related at a fourth successive step of operation, in which the valve is fully open for discharge of fluid from the motor piston to a sump.

Figure 1:
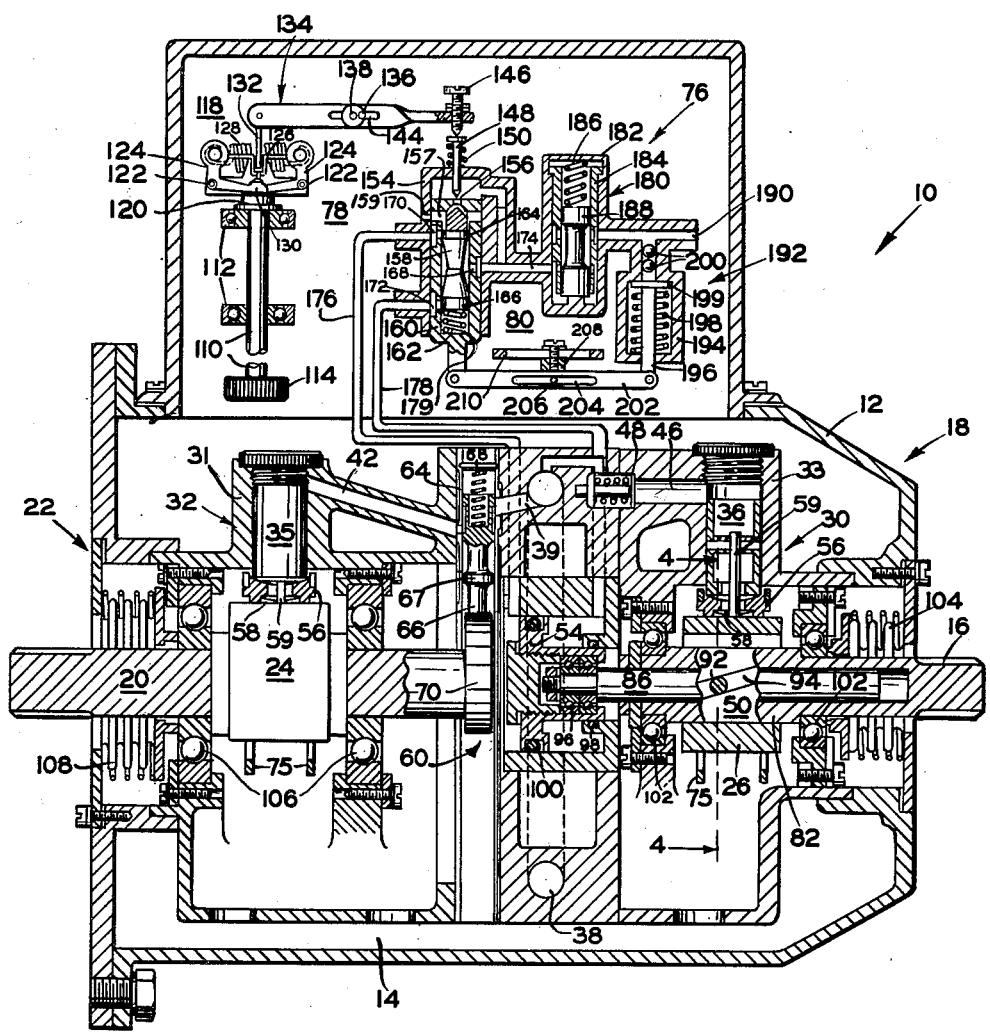
Figure 1 is a schematic diagram of a transmission embodying the invention, showing, in each of its pump and motor units, only one of several pistons of the actual structure, there being actually fifteen pistons in each unit.

Referring to Figure 1, an aircraft hydraulic transmission unit 10 comprises a housing 12 having a sump 14, an engine driven shaft 16 of a pump 18, and a shaft 20 of a fluid motor 22 adapted to drive a generator.

Figure 2:
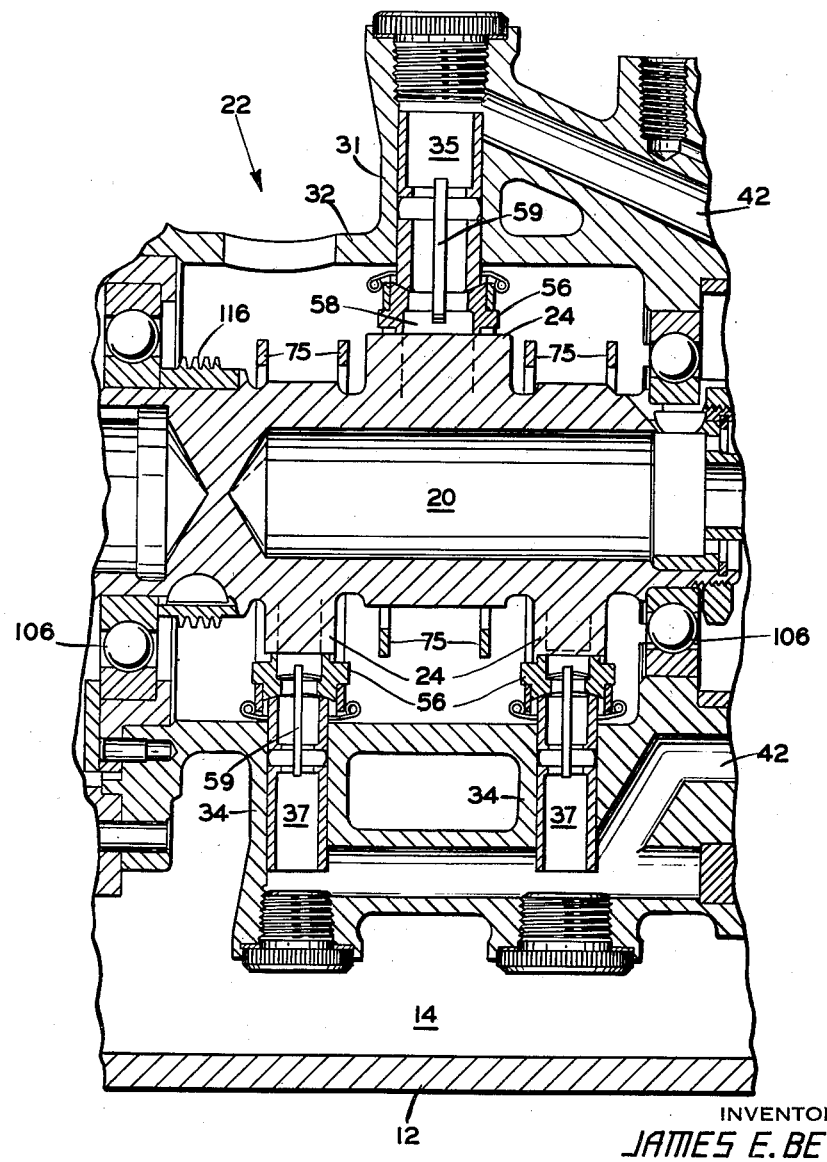
Figure 2 is a side view, generally in section, of a portion of the actual motor unit.

Referring to Figure 2, since Figure 1 illustrates only one piston and associated parts in the pump 18, and only one piston and associated parts in the fluid motor 22, the subsequent description should be read with the actual structure of the motor 22 of Figure 2 in mind, the latter figure also constituting, in effect, a showing of the pump 18, since the only substantial difference between corresponding portions of the motor and the pump resides in the areas of the pump pistons which are larger than the areas of the motor pistons.

Eccentric cams 24 are fixed relative to the motor shaft 20, whereas eccentric cams 26, only one of which is shown in Figure 1, are movably mounted on the pump shaft 16, and are adapted to vary the pump output with the pump and motor cams 26 and 24, respectively, each having segmental surface grooves 28, Figures 5–8, adapted to receive fluid from, and to discharge fluid to, the sump 14, respectively. For purposes of clarity, only one cam 26 is shown in Figure 1, it being understood that the banks of pistons disposed on either side of pistons 36, shown in Figure 1 are each provided with a cam 26.

Pump and motor blocks 30 and 32, respectively, each embodies an odd number of cylinder banks, in this case three, see Figure 2, offset along its shaft, with the cylinders 31 and 33 of the odd banks of the motor and pump, respectively, symmetrically offset from the cylinders 34 of the even bank or banks about its shaft, and having total cylinder area substantially equal to the total even bank cylinder area.

A fluid pressure collector 38 is indicated in Figure 1 as in the form of an annular circular section channel having outlets 39. The cylinders 31 and 34 of the motor 22 have inlets 42 from the collector 38, and the cylinders 33 of the pump 18 have outlets 46 to the collector 38, which outlets 46 are provided with ten poppet valves 48 controlling fluid flow from the pump to the collector 38.

Pump cam eccentricity varying means 50, associated with the pump shaft 16, and to be further set forth, is adapted to be actuated by means including a servo piston 54 aligned with the shafts 16 and 20.

The cylinders 31, 33 and 34 enclose pistons 35, 36 and 37, respectively, each of the through opening or tubular type, including a pivoted cam shoe 56 having a cam engaging surface aperture 58 between its cylinder and the corresponding cam, and connected to its piston as by a connecting rod 59.

Figure 3:
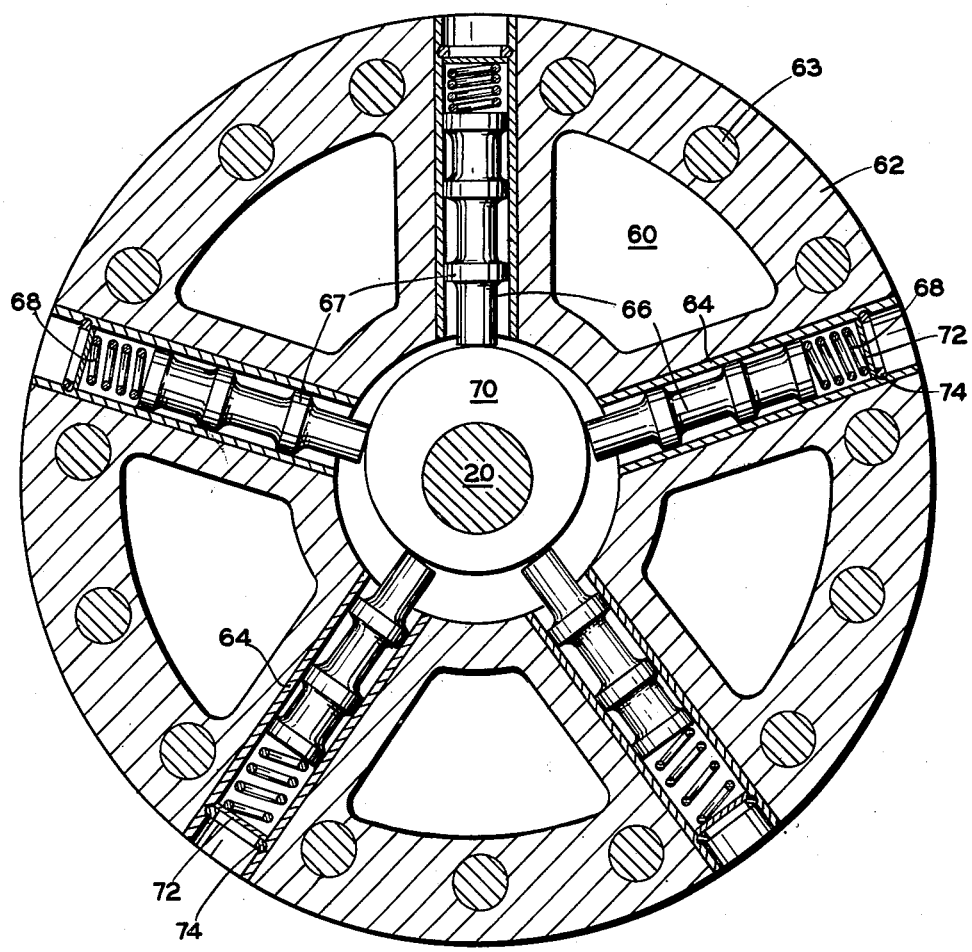
Figure 3 is a detail view of a timing valve assembly indicated in Figure 1, taken at right angles thereto, there actually being two of such assemblies in the device.

Radial valve means 60, Figures 1 and 3, adapted to distribute fluid flow from the collector 38 to the motor cylinders 31 and 34, comprises a disc or wheel-like housing 62 secured in the housing 12, as by bolts 63, and having radial cylinders 64 communicating with the collector outlets 39 and the motor inlets 42, as seen in Figures 1 and 5–8. Plungers 66 having lands 67 in the cylinders 64 are biased, by springs 68, against a cam 70 eccentrically mounted on the shaft 20. The springs 68 are backed by washers 72 and lock rings 74, Figure 3.

Although only one radial valve means 60 is indicated in the diagram of Figure 1, there are actually two of such means. Also, the plungers 66, instead of being maintained on the cam 70 by the springs 68 may be maintained as are the cam shoes 56 at Figure 2 wherein the shoes are maintained by rings 75, also indicated in Figure 1. The plungers 66 may also be maintained by fluid pressure.

Pump fluid operated control means 76, Figure 1, controlled by centrifugal means 78 responsive to the rate of rotation of the motor shaft 20, is adapted to regulate the servo piston 54 in maintaining the pump output and the rate of rotation of the shaft 20 at substantially constant values between zero load and a given overload, as above mentioned, irrespective of variations in the speed of the pump shaft 16. The means 76 includes means 80 responsive to loads on the motor shaft 20 providing for a change in the motor shaft speed within definite percentage limits of the above-mentioned constant values.

Figure 4:
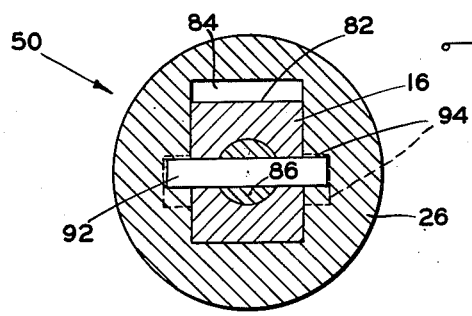
Figure 4 is a sectional view of a detail of the actual structure corresponding to a view taken substantially along the line 4—4 of Figure 1.

The pump cam eccentricity varying means 50, see also Figure 4, comprises a square-section portion 82 of the pump shaft 16, having sliding fit in rectangular holes 84 of the pump cams 26. A rod 86, actuated by the servo piston 54 is axially slidable in the shaft portion 82 and carries a pin 92 slidably fitting a cam slot 94 in each of the cams 26.

Movement of the servo piston 54, right or left, as viewed in Figure 1, acts through the rod 86, the pins 92 and the axially sloping cam surfaces defining the slots 94 to vary the radial distance between cam surfaces of the cams 26 and the axis of the shaft 16, thus varying the lengths of the strokes of the pump pistons.

A pair of ball bearings 96, Figure 1, are mounted between the rod 86, which rotates with the pump shaft 16, and the non-rotative servo piston 54, which is sealed by ring seals 98 and 100.

The pump shaft 16 is journaled, at opposite sides of its cams 26, in ball bearings 102, and provided near its outer end with a bellows seal 104. The motor shaft 20 is journaled, at opposite sides of its cams 24, in ball bearings 106, and provided near its outer end with a bellows seal 108.

The centrifugal means 78, Figure 1, comprises a shaft 110 journaled in bearings 112 having a gear 114, Figure 1, adapted to engage and be rotated by a gear 116, Figure 2, on the motor shaft 20. A governor device 118 comprises a support 120 fixed to the shaft 110, to which support are pivotally mounted, by pins 122, bell crank weight levers 124 held, when stationary, against a stop 126, by a spring or springs 128.

When the shaft 110 rotates, portions 130 of the bell cranks 124, raise a rod 132 to cause a beam 134 of the means 76 to pivot about a pin 136 which is eccentrically adjustable about an axis 138 in a slot 144. To compensate for such adjustment, a screw 146 may be adjusted relative to a needle valve pin 148 which it depresses against the action of a spring 150 associated with a servo cylinder 154, relative to an orifice 156 in a servo pilot plunger 158. The orifice 156 leads into a chamber 157 containing a port 159 which communicates with the exterior of the servo cylinder 154. The pilot plunger 158 is slidable in a droop sleeve 160 over a spring 162 in the sleeve, and has lands 164 and 166, at opposite sides of a side duct 168 in the sleeve 160, and controls ducts 170 and 172, respectively, also in the sleeve 160. The duct 168 registers with a conduit 174, and the ducts 170 and 172 communicate with conduits 176 and 178, respectively, leading to the left and right hand sides, respectively of the servo piston 54, as indicated in Figure 1. Droop sleeve 160 is also provided with a drain port 179 to permit exhausting of servomotor 54 when it moves to the right as shown in Figure 1.

The conduit 174 communicates with a reducing valve 180, comprising a casing 182, a sleeve 184, a spring 186, and a plunger 188, the casing 182 having an inlet 190 from the collector 38.

A droop valve 192 comprises a casing 194 connected to the inlet 190, and containing a plunger 196 biased upwardly, as shown, by a spring 198 extending between the bottom of the casing 194 and a disc 199. Two balls 200 operate as a non binding piston under the high pressures involved.

The plunger 196 and the droop sleeve 160 are connected by a link 202 having a slot 204 in which a pivot pin 206 is free to ride. The pin 206 is attached to a member 208 which in turn slidably mounted on the support 210 so that by sliding the member 208 along the support 210, the pin 206 may be adjusted in any desired position in slot 204.

In operation, on the intake stroke, hydraulic oil is drawn through the apertures 58 of the pump piston shoes 56 from the sump 14, the latter being defined by the housing 12, which is filled with oil and held at inlet pressure of approximately ten to fifteen pounds per square inch.

On the compression stroke of each piston 36, the poppet valves 48 are opened, when the pressure build up is greater than the pressure in the collector 38, allowing the oil to flow into the collector. Thus, there are fifteen pump pistons 36 so displaced as to effect a relatively even flow of oil through the ten poppet valves 48 to the collector 38.

Since the speed of the motor 22 must be substantially constant, the flow from the pump 18 must be correspondingly constant over a pump input speed range, in this instance, of from 2000 to 9000 R. P. M. Substantially constant flow from the pump 18 is obtained by varying the strokes of the pump pistons 36, maximum strokes being necessary at 2000 R. P. M. input, and minimum strokes being necessary at 9000 R. P. M., input. Substantially constant flow from the pump 18 is accomplished by means of the control means 76 and the master servo 54 operating in conjunction with the variable stroke pump cams 26.

An increase in the speed of the motor shaft 20 acts through the gear 116, Figure 2; the gear 114, Figure 1, the shaft 110, the portions 130, the rod 132, the beam 134, and the screw 146 to cause a downward motion of the needle valve pin 148 which, in turn, starts to close the orifice 156. Since the conduit 174 communicates with the casing 182 which in turn has an inlet 190 from the collector 38, pressure is built up in the servo pilot cylinder 154 which moves the servo pilot 158 downwardly, allowing oil under pressure to flow into the conduit 178 which communicates with the cylinder of the master servo piston 54, thus moving the piston 54 to the left and decreasing the stroke of the pump pistons 36 by moving the pins 92 such as to move the high points of the pump cams 26 closer to the axis of the pump shaft 16.

A decrease in the speed of the motor shaft 20 conversely allows the servo pilot 158 to move upwardly by spring 162, allowing oil under pressure to flow into the conduit 176, thus moving the master servo piston 54 to the right and increasing the stroke of the pump pistons.

To obtain the 8% droop, desired in this instance, over a load range of 0 to 150%, the member 208, Figure 1, is adjusted along the support 210 to adjust the position of the pin 206 so that, at any point between 0 and 150% load, the speed of the motor 22 will correspond to a predetermined value determined from a speed-load curve incorporating the 8% droop. The relative positions of the droop sleeve 160 and the servo pilot 158 are set by the adjusting sliding pivot 206 to give the required droop characteristics.

In the operation of the motor 22, hydraulic oil under pressure in the collector 38 is ported to the motor pistons 35 and 37 in proper sequence by the valve plungers 66 operated by the cam 70 on the motor shaft 20.

In Figure 5, the piston 35 is at the top of its stroke, and the corresponding valve plunger 66 is 90° from the top of its stroke. At this point, the piston inlet 42 is blocked by the land 67, and oil under outlet pressure is in the outlet 39 and above the land 67, while oil under inlet pressure is below the land 67.

To start rotation of the motor shaft 20, others of the motor plungers are on the downstroke and oil under high pressure is allowed to flow into the piston in a manner similar to that shown in Figure 6. This pressure on the piston exerts a force tending to rotate the motor shaft in the counterclockwise direction indicated by an arrow, as shown.

In Figure 6, the piston 35 is shown as positioned after the shaft 20 has rotated 90° from its position of Figure 5. It is half way on the down stroke, whereas the timing valve plunger 66 has reached its lowermost position. At this stage, the inlet port 42 to the cylinder of the piston 35 is wide open, and the piston is under the full pump outlet pressure of the oil from the outlet 39.

The port 42 to the piston 35 will be gradually closed during the next following 90° rotation of the shaft 20 until, as in Figure 7, it is completely closed again as it is in Figure 5, the only difference being that the piston 35 is now at the bottom of the stroke and the timing valve 66 again at half stroke.

During the next subsequent 90° rotation of the shaft 20, the port 42 will be gradually opened, but, this time, to the inlet side allowing oil to be discharged through the port 42 by way of the plunger 66 to the sump. Oil is also discharged through the piston shoe by way of the groove 28 while the piston 35 is on its up stroke.

At the position of Figure 8, the piston is half way on its up stroke and the timing valve 66 is at the top of its stroke, at which time the valve port 42 is wide open to the inlet side of the drive. During the next subsequent 90° rotation, the valve port 42 is gradually closed, allowing oil to flow from the piston to the inlet side until the valve port 42 is completely closed, as in Figure 5.

Oil is also allowed to flow through the piston shoe by way of the groove 28 to the inlet side until the piston shoe is over the solid section of the cam, as indicated in Figure 5.

Although only one embodiment of the invention has been illustrated and described, various changes in the form and relative arrangements of the parts may be made to suit requirements.

What is claimed is:

1. In an aircraft hydraulic transmission, the combination of a sump, an engine driven pump shaft, a motor shaft to drive a generator, eccentric cams fixed to the motor shaft, eccentric cams movable on the pump shaft to vary the pump output, the pump and motor cams having segmental cam surface grooves to receive fluid from and to discharge fluid to the sump, respectively, pump and motor blocks each embodying an odd number of cylinder banks offset along its shaft with the cylinders of the odd banks symmetrically offset from the cylinders of the even bank or banks about its shaft and having total cylinder area substantially equal to the total even bank cylinder area, a pump output collector, the motor cylinders having inlets from the collector and the pump cylinders having outlets to the collector, poppet valve means controlling the delivery of the pump output to the collector, pump cam eccentricity varying means associated with the pump shaft, means including a servo piston aligned with the shafts for actuating said eccentricity varying means, a through opening tubular piston in each cylinder including a pivoted cam shoe having a cam engaging surface aperture between its cylinder and cam, radial valve means to distribute pump output from the collector to the motor cylinders, eccentric means on the motor shaft for operating said radial valve means, centrifugal means responsive to motor shaft speed, pump pressure responsive means, and pump fluid operated valve means controlled by joint operation of said centrifugal and pump pressure responsive means to regulate the servo piston in maintaining said pump output and said motor shaft speed at substantially constant values between zero load and given overload irrespective of variations in the speed of the pump shaft and providing for a change in the motor shaft speed within definite percentage limits of said constant values.

2. In a hydraulic transmission, the combination of a pump shaft, a motor shaft, a sump, eccentric cams fixed to the motor shaft, movable eccentric cams on the pump shaft to vary the pump output, the pump and motor cams having segmental cam surface grooves to receive fluid from and to discharge fluid to the sump, respectively, pump and motor blocks each embodying an odd number of cylinder banks offset along its shaft with the cylinders of the odd banks symmetrically offset from the cylinder or cylinders of the even bank or banks about its shaft and having total cylinder area substantially equal to the even bank total cylinder area, a pump output collector, the motor cylinders having inlets from the collector and the pump cylinders having outlets to the collector, valve means controlling delivery of the pump output to the collector, pump cam eccentricity varying means, means including a servo piston to actuate said eccentricity varying means, a through opening tubular piston in each cylinder including a pivoted cam shoe having a cam engaging surface aperture between its cylinder and cams, radial valve means to distribute pump output from the collector to the motor cylinders, eccentric means on the motor shaft for operating said radial valve means, centrifugal means responsive to motor shaft speed, pump pressure responsive means and pump fluid operated valve means controlled by the joint operation of said centrifugal and pump pressure responsive means to regulate the servo piston in maintaining said pump output and said motor shaft speed at substantially constant values between zero load and given overload irrespective of variations in the speed of the pump shaft and providing for a change in the motor shaft speed within definite percentage limits of said constant values.

3. In hydraulic transmission means, the combination of a pump shaft, a motor shaft, eccentric cams fixed to the motor shaft, a sump, movable eccentric cams on the pump shaft to vary the output of said pump, the pump and motor cams having segmental cam surface grooves to receive fluid from and to discharge fluid to the sump, respectively, pump and motor blocks each embodying an odd number of cylinder banks offset along its shaft with the cylinders of the odd banks symmetrically offset from the cylinder or cylinders of the even bank or banks about its shaft and having total cylinder area substantially equal to the even bank total cylinder area, a pump output collector, the motor cylinders having inlets from said collector and the pump cylinders having outlets to the collector, valve means controlling delivery of pump output from the pump to the collector, pump cam eccentricity varying means, servo means to actuate said eccentricity varying means, a through opening tubular piston in each cylinder including a pivoted cam shoe having a cam engaging surface aperture between its cylinder and cam, a valve device to distribute the pump output from the collector to the motor cylinders, means operating said valve device from the motor shaft, centrifugal means responsive to motor shaft speed, pump pressure responsive means, and pump fluid operated valve means controlled by the joint operation of said centrifugal and pump pressure responsive means to regulate said servo means in maintaining said pump output and said motor shaft speed at substantially constant values between zero load and given overload irrespective of variations in the speed of the pump shaft.

4. In hydraulic transmission means, the combination of a sump, a fluid operated motor including outlet means to the sump and having a shaft, a collector, a pump including a shaft and connected to pump fluid from the sump to the collector, means including valve means for controlling the delivery of pump output from the pump to the collector, means to vary the output of the pump, said vary means comprising a plurality of eccentric cams on the pump shaft rotative herewith and radially movable relative thereto, the pump shaft being hollow and having sloping slots to increase and decrease eccentricity of the cams, a rod axially movable in the pump shaft, and pins projecting laterally from the rod and disposed one extending through each of said sloping slots, a piston concentric with said pump shaft to move the rod axially, valve means distributing the pump output from the collector to the motor for actuating the motor, centrifugal means responsive to motor shaft speed, pump pressure responsive means, and valve means controlled by the joint operation of said centrifugal and pump pressure responsive means to actuate said piston and thereby said pump output varying means in maintaining said pump output and said motor shaft speed at substantially constant values between zero load and given overload irrespective of variations in the speed of the pump shaft.

5. In hydraulic transmission means, the combination of a sump, a fluid operated motor including outlet means to the sump and having a shaft, a collector, a pump including a shaft and connected to pump fluid from the sump to the collector, means including valve means for controlling the delivery of pump output from the pump to the collector, means to vary the pump output, said varying means comprising a plurality of eccentric cams on the pump shaft rotative therewith and radially movable relative thereto, means including a rod axially movable in the pump shaft to move said cams radially, and piston means to move the rod axially, valve means distributing the pump output from the collector to the motor for actuating the motor, centrifugal means responsive to motor shaft speed, pump pressure responsive means, and valve means controlled by said centrifugal and pump pressure responsive means to actuate said piston means and thereby the pump output varying means in maintaining said pump output and said motor shaft speed at substantially constant values between zero load and given overload irrespective of variations in the speed of the pump shaft.

6. In hydraulic transmission means, the combination of a sump, a fluid operated motor including outlet means to the sump and having a shaft, a collector, a pump including a shaft and connected to pump fluid from the sump to the collector, means including valve means for controlling the delivery of the pump output from the pump to the collector, means including piston means to vary the output of the pump, radial valve means controlling the delivery of pump output from the collector to said motor for actuating the motor, radial valve actuating means including eccentric means carried by the motor shaft, centrifugal means responsive to motor shaft speed, pump pressure responsive means, and valve means controlled by joint operation of said centrifugal and pump pressure responsive means to actuate said piston means and thereby the output varying means in maintaining said output and said motor shaft speed at substantially constant values between zero load and given overload irrespective of variations in the speed of the pump shaft.

JAMES EMIL BEVINS.

REFERENCES CITED

The following references are of record in the file of this patent:

UNITED STATES PATENTS

| Number | Name | Date |
|---|---|---|
| 1,321,086 | Centervall | Nov. 11, 1919 |
| 2,056,896 | Douglas | Oct. 6, 1936 |
| 2,069,230 | Ferris | Feb. 2, 1937 |
| 2,391,735 | Orshansky | Dec. 25, 1945 |
| 2,394,285 | Bevins | Feb. 5, 1946 |

FOREIGN PATENTS

| Number | Country | Date |
|---|---|---|
| 366,097 | Italy | Dec. 19, 1938 |